(12) United States Patent
Pelly et al.

(10) Patent No.: US 7,369,675 B2
(45) Date of Patent: May 6, 2008

(54) DATA PROCESSING APPARATUS AND METHOD

(75) Inventors: Jason Charles Pelly, Reading (GB); Daniel Warren Tapson, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 866 days.

(21) Appl. No.: 10/606,732

(22) Filed: Jun. 26, 2003

(65) Prior Publication Data

US 2004/0066951 A1    Apr. 8, 2004

(30) Foreign Application Priority Data

Jun. 28, 2002   (GB) ................... 0215070.4

(51) Int. Cl.
   *G06K 9/00* (2006.01)

(52) U.S. Cl. .................. 382/100; 380/201; 705/57

(58) Field of Classification Search ............... 382/100, 382/232, 240; 713/176, 179; 370/522–529; 283/72, 74, 75, 76, 77, 78, 79, 81, 85, 93, 283/901, 902; 704/500; 375/240, 240.03; 380/51, 54, 201, 210, 252, 287, 203

See application file for complete search history.

(56) References Cited

U.S. PATENT DOCUMENTS

| | | | |
|---|---|---|---|
| 4,575,770 A * | 3/1986 | Dieterich | 386/116 |
| 6,374,036 B1 * | 4/2002 | Ryan et al. | 386/94 |
| 6,529,551 B1 * | 3/2003 | Yu et al. | 375/240.03 |
| 6,888,893 B2 * | 5/2005 | Li et al. | 375/240.25 |
| 2004/0243258 A1 * | 12/2004 | Shattil | 700/73 |

(Continued)

FOREIGN PATENT DOCUMENTS

| | | |
|---|---|---|
| EP | 1 030 511 A2 | 8/2000 |
| GB | 2 369 950 | 6/2002 |

(Continued)

OTHER PUBLICATIONS

Tsung-Li Wu, et al, "Selective Encryption and Watermarking on MPEG Video", International Conference on Image Science, XP-002439571, Feb. 17, 1997, a cover page, and pp. 1-9.

(Continued)

*Primary Examiner*—Abolfazl Tabatabai
(74) *Attorney, Agent, or Firm*—Oblon, Spivak, McClelland, Maier & Neustadt, P.C.

(57) ABSTRACT

A system for watermarking and distributing material includes a data processing apparatus, which operates as a watermark encoder. The data processing apparatus is operable to process an original material item to form a reduced-bandwidth-version of the material item, marked with a code word from a predetermined set of code words. The data processing apparatus is operable to form an impaired version of the material item from which a marked representation of the original material item can be formed. The impaired version is formed by subtracting the reduced-bandwidth-version of the material item from a copy of the original material item. As such, the impaired version can be mass distributed, but a representation of the original material item cannot be formed without the reduced-bandwidth-version of the material item. By watermarking the reduced-bandwidth-versions, a representation of the material item, formed by combining one of the marked reduced-bandwidth-versions with the impaired material item, can be uniquely identified. However, only a low bandwidth part of the material item need be watermark encoded, which is more easily distributable to individual recipients than watermarked copies of the original material item.

30 Claims, 7 Drawing Sheets

FOREIGN PATENT DOCUMENTS

| | | |
|---|---|---|
| GB | 2 370 437 | 6/2002 |
| JP | 5-227444 | 9/1993 |
| JP | 6-225151 | 8/1994 |
| JP | 2000-236432 | 8/2000 |
| JP | 2002-171397 | 6/2002 |
| WO | WO 98/03014 | 1/1998 |
| WO | WO 01/67667 A1 | 9/2001 |

OTHER PUBLICATIONS

Deepa Kundur, et al., "Digital Watermarking Using Multiresolution Wavelet Decomposition", Proceedings of the 1998 IEEE International Conference on Acoustics, Speech and Signal Processing, XP002927403, vol. 5, May 12, 1998, pp. 2969-2972.

Roland Parviainen, et al., "Large Scale Distributed Watermarking of Multicast Media Through Encryption", http://citeseer.nj.nec.com7447585.html, XP-002239136, 2001, 10 pages.

Ian Brown, et al., "Watercasting: Distributed Watermarking of Multicast Media" NGC'99, LNCS 1736, XP019000303, 1999, pp. 286-300.

\* cited by examiner

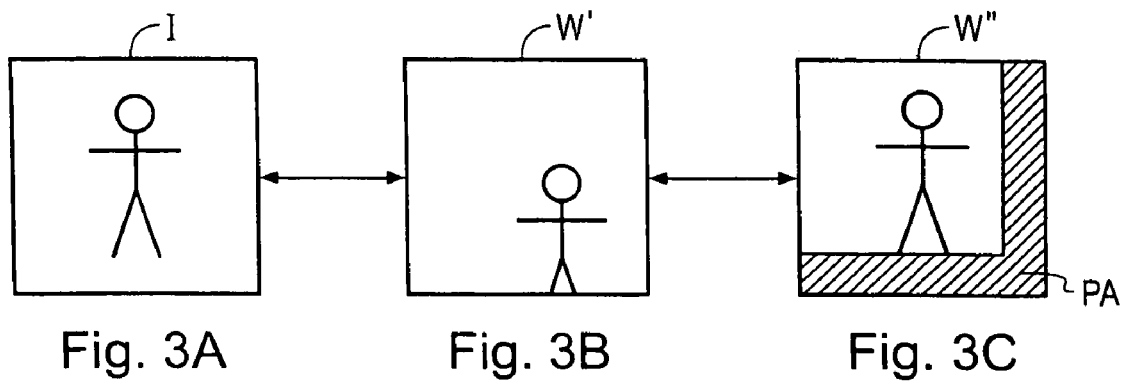
Fig. 3A  Fig. 3B  Fig. 3C
Fig. 3
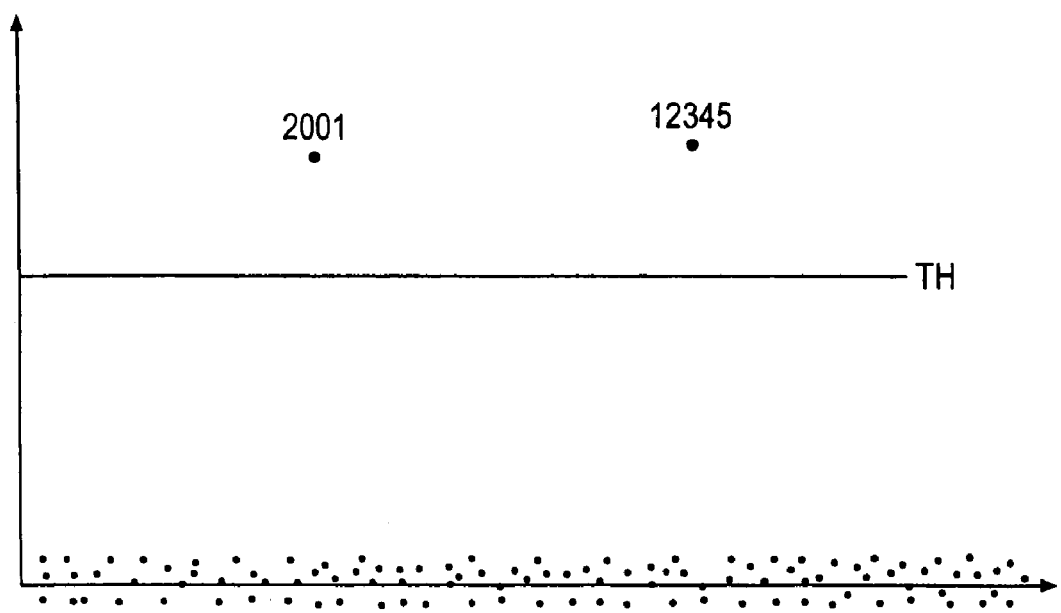
Fig. 4

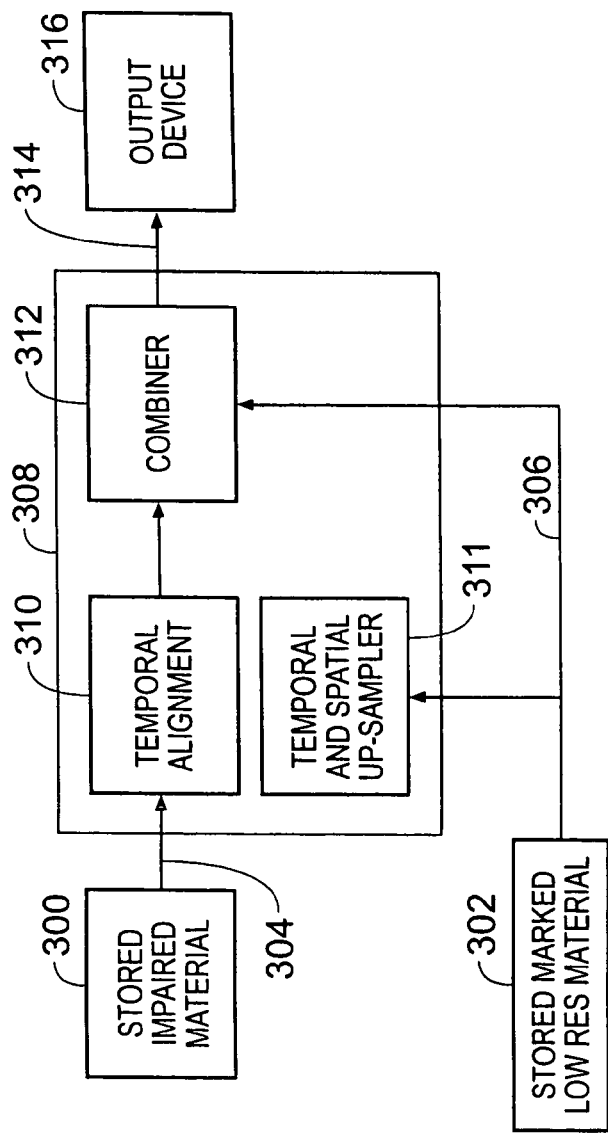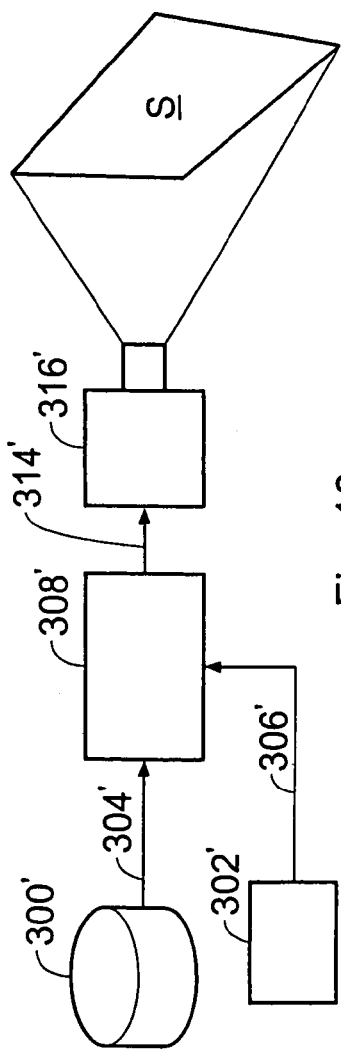

DATA PROCESSING APPARATUS AND METHOD

FIELD OF INVENTION

The present invention relates to data processing apparatus and methods, which are arranged to form versions of material items, which are marked with code words. In some applications the code words are used to uniquely identify the material items.

Correspondingly, the present invention also relates to data processing apparatus and methods operable to detect one or more code words, which may be present in a material item.

BACKGROUND OF THE INVENTION

A process in which information is embedded in material for the purpose of identifying the material is known as watermarking. Watermarking can provide a facility for identifying a recipient of a particular version of the material. As such, if the material is copied or used in a way, which is inconsistent with the wishes of the distributor of the material, the distributor can identify the material version from the identification code word and take appropriate action.

In this description, an item of material, which is copied or used in a way, which is inconsistent with the wishes of the originator, owner, creator or distributor of the material, will be referred to for convenience as an offending item of material or offending material. The material could be any of video, audio, audio/video material, software programs, digital documents or any type of information bearing material.

Any watermarking scheme should be arranged to make it difficult for users receiving copies of the same material to collude to either mask a watermark code word or alter a watermark code word. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty of taking part in a collusion attack, when this user has not taken part, should be as low as possible (false positive probability).

U.S. Pat. No. 5,664,018 discloses a watermarking process in which a plurality of copies of material items are marked with a digital watermark formed from a code word having a predetermined number of coefficients. The watermarked material item is for example an image. The apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT. A related publication entitled "Resistance of Digital Watermarks to Collusion Attacks", by J. Kilian, F. T. Leighton et al, published by MIT, Jul. 27, 1998, provides a detailed mathematical analysis of this watermarking process to prove its resistance to attack. Co-pending UK patent applications 0129865.2, 0129841.3, 0129840.5, 0129907.5 and 0129836.3 disclose encoding and detecting apparatus and methods which aim to provide a practical watermarking system, which utilises code words having coefficients which are randomly distributed as proposed in U.S. Pat. No. 5,664,018.

SUMMARY OF INVENTION

An object of the present invention is to provide an improved watermarking apparatus and method. Another object of the present invention is to provide improved watermarking and distribution of material items.

According to an aspect of the present invention there is provided a data processing apparatus operable to process an original material item to form a reduced-bandwidth-version of the material item marked with a code word from a predetermined set of code words. The data processing apparatus is operable to form an impaired version of the material item from which a marked representation of the original material item can be formed. The impaired version is formed by removing the reduced-bandwidth-version of the material item from a copy of the original material item.

Embodiments of the present invention can provide a data processing apparatus, which is arranged to form an impaired version of a material item for distribution. The impaired version is formed by generating a reduced-bandwidth-version of the material item and subtracting the reduced-bandwidth-version from a copy of the original material item. Moreover, to each of a plurality of copies of the reduced-bandwidth-version of the material item one of a predetermined set of code words is introduced to form a plurality of marked-reduced-bandwidth-versions. Therefore, to form a representation of an original material item, a recipient must combine the marked-reduced-bandwidth-version with the impaired version of the material item.

Embodiments of the present invention provide advantages in distributing and watermarking material items. Typically, the impaired version of a material item will represent the major part of the material item. The material item will usually require a relatively high communications bandwidth and/or correspondingly a high storage capacity. The impaired version therefore represents the majority of this high capacity or storage requirement.

One advantage of generating the impaired version is that a recipient may sample the impaired material to determine its suitability. For the example of video material the recipient may view the material. In order to form a faithful representation of the original material item, the reduced-bandwidth-version must be combined with the impaired version. Since a watermark code word has been introduced into the reduced-bandwidth-version version, the resulting representation of the original material item can be uniquely identified.

A further advantage of forming the relatively high bandwidth version and a marked reduced-bandwidth-version of the material item is that the impaired version may be mass reproduced using conventional techniques. The impaired version may also be distributed using conventional media. On the other hand, if a watermark code word from the set of code words were to be added to each copy of the original material item, then a unique copy would result for each, which would be difficult to mass produce. Mass reproduction of the impaired version can be effected, for example, by multi-casting the impaired version from a web server, or producing, for example CDs or DVDs, or video cassettes.

Since a watermark code word is introduced into the reduced-bandwidth-version of the material, a time taken to form a marked version of the material item is substantially reduced with respect to a time required to introduce the code word into the original material item. The time reduction is particularly important when considering a relative large number of versions of a material item such as a video recording, DVD or film, which is to be mass distributed.

Furthermore, in some applications the marked-reduced-bandwidth-version of the material item may only be provided once a transaction such as an exchange of money or money's worth has been provided.

There are various known techniques for forming the reduced-bandwidth-version of the original material item. Typically, in order to form the impaired version of the material item, the reduced-bandwidth-version is up-converted so that it can be subtracted from the copy of the original material item. As such, in some embodiments the data processing apparatus may include a second bandwidth adaptation processor operable to up-convert the reduced-bandwidth-version of the original material item in accordance with the bandwidth reduction performed by the first bandwidth adaptation processor. As a result the bandwidth of the up-converted reduced-bandwidth-version corresponds to that of the original material item. The material adaptation processor may then subtract the up-converted reduced-bandwidth-version from the copy of the original material item. In other embodiments the bandwidth adaptation processor may include a wavelet transform processor. The wavelet transform processor forms a wavelet transform of the material item. The reduced-bandwidth-version is formed by selecting one of the wavelet sub-bands and the impaired version is formed from the remaining sub-bands.

As will be appreciated from the above explanation, an aspect of the present invention provides a reproducing apparatus for reproducing a representation of an original material item. The representation of the original material item is reproduced from a reduced-bandwidth-version of the material item marked with a code word from a predetermined set of code words and an impaired version of the material item. The reproducing apparatus comprises a receiver operable to receive the impaired version of the material item, and to receive the marked reduced-bandwidth-version of the original material item, and a combiner. The combiner is operable to combine the marked reduced-bandwidth-version of the material item with the impaired version to reproduce a representation of the original material item.

From the above discussion it will be appreciated that embodiments of the present invention can provide a reproduction apparatus such as a cinema projector, a web server or a video reproduction system. The reproducting apparatus is arranged to generate a representation of the original material item by combining the impaired version of the material item with the reduced-bandwidth-version. As explained above, because the reduced-bandwidth-version has been marked with a code word, the reproduced representation of the material item can be uniquely identified by detecting the code word in a suspect copy of the reproduced version.

According to a further aspect of the present invention, there is provided a detecting data processing apparatus operable to determine whether one or more code words of a predetermined set of code words is present in a suspected marked version of a material item. The apparatus comprises a bandwidth processor operable to form a reduced-bandwidth-version of a copy of the original material item, the bandwidth reduction being at least one of temporally or spatially effected. The bandwidth processor is also operable to form a reduced-bandwidth-version of the suspected version of the material, the bandwidth reduction being formed in correspondence with the bandwidth reduction effected on the original material item. The detection processor further comprises a correlation processor and a detection processor. The correlation processor is operable to generate, for each of the code words in the predetermined set of code words, a correlation value, by correlating the recovered code word with each of the generated code words. The detection processor is operable to detect one or more code words from the correlation value for the code word exceeding a predetermined threshold.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which:

FIG. 3A is a representation of an original image, FIG. 3B is a representation of a marked image and FIG. 3C is the marked image after registration;

FIG. 4 is a graphical representation of an example correlation result for each of a set of N code words;

FIG. 9 is a schematic block diagram of a reproducing apparatus for reproducing a representation of a material item by combining an impaired version of the material item with the reduced-bandwidth-version of the material item produced by the watermark encoder;

FIG. 10 is a schematic block diagram of a digital cinema projector; and

DESCRIPTION OF PREFERRED EMBODIMENTS

Watermarking System Overview

An explanation of a watermarking technique utilised by embodiments of the present invention will now be described with reference to protecting, for example video images. The number of users to which the video images are to be distributed determines the number of copies. To each copy a watermark code word is added which identifies the copy assigned to one of the users.

Video images are one example of material, which can be protected by embedding a digital code word. Other examples of material, which can be protected by embedding a code word, include software programs, digital documents, music, audio signals, audio/visual material, multi-media content and any other information-bearing signal.

Figure 1:
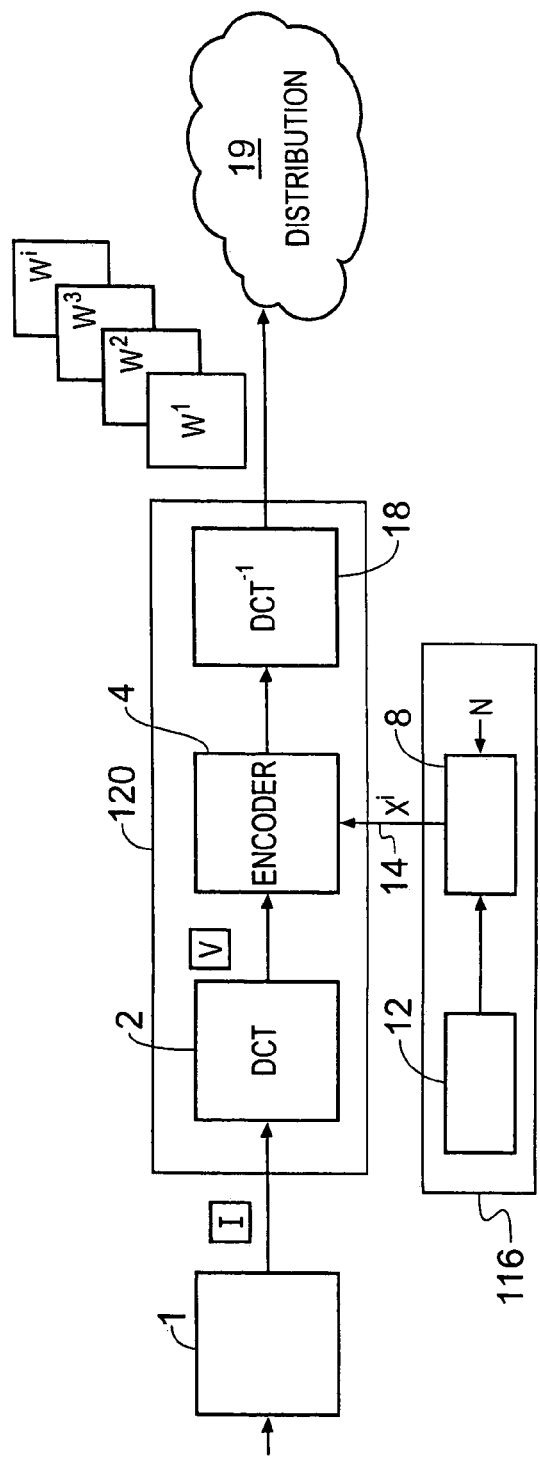
FIG. 1 is a schematic block diagram of a data processing apparatus which operates as a watermark encoder.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which are otherwise, produced from the image pixels. Therefore, where appropriate the terms samples and pixels are inter-changeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus, for each code word there is a corresponding seed which is stored in a data store 12. Therefore, it will be understood that to generate the code word $X^i$, $seed_i$ is retrieved from memory 12 and used to initialise the random number generator within the code word generator 8.

In the following description the DCT version of the original image is represented as V, where;

$$V = \{v_i\} = \{v_1, v_2, v_3, v_4, \ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i = \{x_j^i\} = \{x_1^i, x_2^i, x_3^i, x_4^i, \ldots x_n^i\}$$

The number of code word coefficients n corresponds to the number or samples of the original image V. However, a different number of coefficients is possible, and will be determined in dependence upon a particular application.

A vector of code word coefficients $X^i$ forming the i-th code word is then passed via channel 14 to the encoder 4. The encoder 4 is arranged to form a watermarked image $W_i$ by adding the code word $X^i$ to the image V. Effectively, therefore, as represented in the equation below, each of the code word coefficients is added to a different one of the coefficients of the image to form the watermark image $W_i$.

$$W^i = V + X^i$$

$$W^i = v_1 + x_1^i, \ v_2 + x_2^i, \ v_3 + x_3^i, \ v_4 + x_4^i, \ldots v_n + x_n^i$$

As shown in FIG. 1, the watermarked images $W_i$ are formed at the output of the image processing apparatus by forming inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10 000 000 code words can be selected to generate 10 million watermarked $W_i$ versions of the original image I.

As shown in FIG. 1, the DCT processor 2, the encoding processor 4 and the inverse DCT processor 18 form a watermark encoder 120. The watermark encoder 120 also forms part of a data processing apparatus shown in FIG. 5, which will be explained shortly. Furthermore the data store 12 and the code word generator 8 form a watermark generator 116, which also appears in FIG. 5.

Although the code word provides the facility for uniquely identifying a marked copy $W_i$ of the image I, in other embodiments the 20 bits can provide a facility for communicating data within the image. As will be appreciated therefore, the 20 bits used to select the identification code word can provide a 20 bit pay-load for communicating data within the image V.

The encoding image processing apparatus which is arranged to produce the watermarked images shown in FIG. 1 may be incorporated into a variety of products for different scenarios in which embodiments of the present invention find application. These will be explained shortly with reference to a distribution system providing for an example embodiment of the invention. However, generally the distribution of the watermarked images produced by the encoding image processing apparatus shown in FIG. 1 is represented by a distribution cloud 19. A more detailed explanation of the distribution of, for example, video, film or other relatively high bandwidth material item will be explained shortly. First an indication of code word detection is provided.

Detecting Processor

Figure 2:
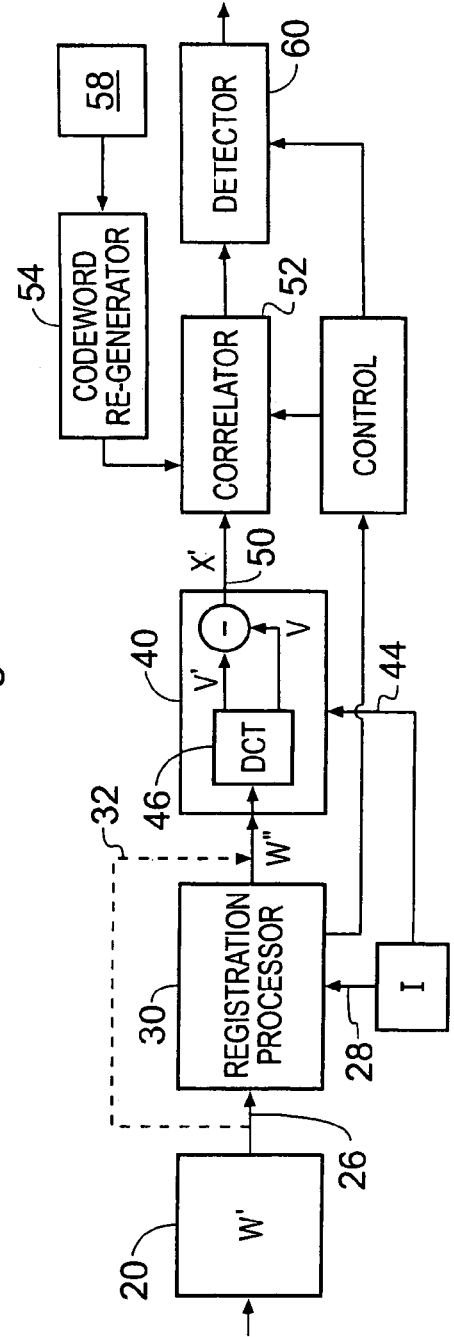
FIG. 2 is a schematic block diagram of a detecting data processing apparatus.

A detecting image processing apparatus which is arranged to detect one or more of the code words, which may be present in an offending marked image is shown in FIG. 2. Generally, the image processor shown in FIG. 2 operates to identify one or more of the code words, which may be present in an offending copy of the image.

The offending version of the watermarked image W' is received from a source and stored in a frame store 20. Also stored in the frame store 24 is the original version of the image I, since the detection process performed by the image processor requires the original version of the image. The offending watermarked image W' and the original version of the image are then fed via respective connecting channels 26, 28 to a registration processor 30.

As already explained, a suspect version of the image W' may have been produced by photographing or otherwise reproducing a part of the watermarked image $W^i$. As such, in order to improve the likelihood of detecting the identification code word, the registration processor 30 is arranged to substantially align the offending image with the original version of the image present in the data stores 20 and 24. The purpose of this alignment is to provide a correspondence between the original image samples I and the corresponding samples of the watermarked image $W^i$ to which the code word coefficients have been added.

The effects of the registration are illustrated in FIG. 3. In FIG. 3 an example of the original image I is shown with respect to an offending marked version of the image W'. As illustrated in FIG. 3, the watermarked image W' is offset with respect to the original image I and this may be due to the relative aspect view of the camera from which the suspect version of the watermarked image was produced.

In order to recover a representation of the code word coefficients, the correct samples of the original image should be subtracted from the corresponding samples of the marked offending image. To this end, the two images are aligned. As shown in FIG. 3, the registered image W''' has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting image processor is provided with an alternative channel 32, which communicates the marked image directly to the recovery processor 40.

The registered image W''' is received by a recovery processor 40. The recovery processor 40 also receives a copy of the original image I via a second channel 44. The registered image W''' and the original image I are transformed by a DCT transform processor 46 into the DCT domain. An estimated code word X' is then formed by subtracting the samples of the DCT domain marked image V' from the DCT domain samples of the original image V as expressed by the following equations:

$$X' = V' - V$$

$$= v'_1 - v_1, v'_2 - v_2, v'_3 - v_3, v'_4 - v_4, \ldots, v'_n - v_n,$$

$$= x'_1, x'_2, x'_3, x'_4, \ldots x'_n$$

The output of the recovery processor 40 therefore provides, on a connecting channel 50, an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x_1^i \cdot x'_1 + x_2^i \cdot x'_2 + x_3^i \cdot x'_3 + \ldots + x_n^i \cdot x'_n}{\sqrt{x_1^i \cdot x'_1 + x_2^i \cdot x'_2 + x_3^i \cdot x'_3 + \ldots + x_n^i \cdot x'}}$$

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million, and the watermarking strength α, the height of the threshold TH can be set in order to guarantee the false detection probability. As in the example in FIG. 4, if the similarity values produced by the correlator 52 exceed the threshold then, with this false positive probability, the recipients of the marked image are considered to have colluded to form the offending watermarked version of the image $W^i$.

Distribution System

A system for watermarking and distributing material items will now be described with reference to a data processing apparatus shown in FIG. 5, which forms a watermark encoder. The watermarking encoder shown in FIG. 5 in combination with a detection data processor shown in FIG. 6 form a material distribution and watermark protection system which can be used to protect the rights of the owner of the material. The watermark encoder will now be described.

Figure 5:
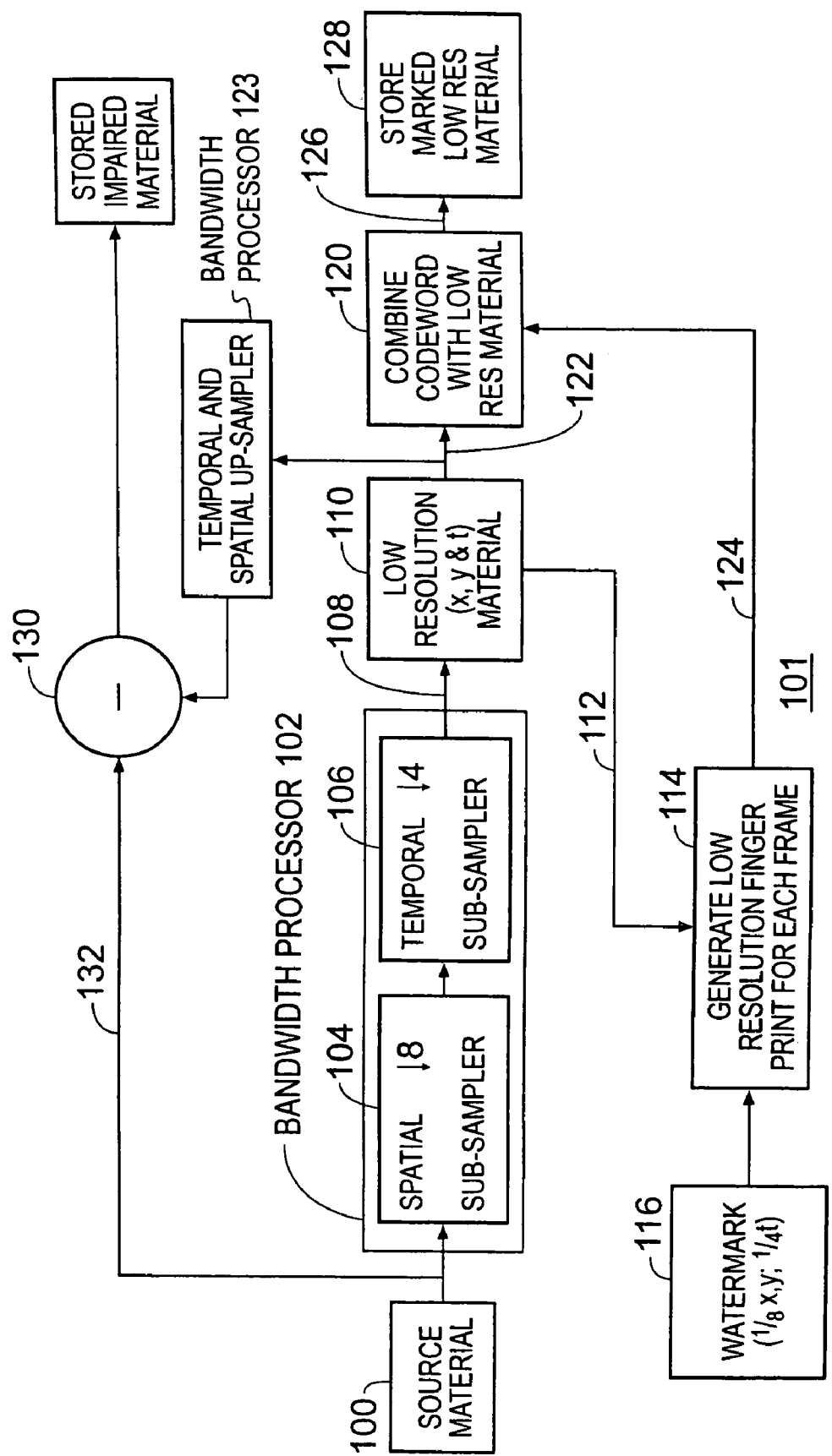
FIG. 5 is a schematic block diagram of a data processing apparatus, which operates as a watermark encoder according to an embodiment of the invention.

As shown in FIG. 5 an original material item is received from a material source 100 by a bandwidth processor 102. The bandwidth processor 102 is arranged to form a reduced-bandwidth-version of the material item in digital form. Since the material item is in digital form, the bandwidth reduction of the original material item may be formed by either temporally or spatially sub-sampling the material, or temporally and spatially sub-sampling the material. According to the example embodiment, the bandwidth processor 102 is provided with a spatial sub-sampler 104 and a temporal sub-sampler 106, so that the bandwidth reduction is performed both spatially and temporally. In alternative embodiments the bandwidth reduction may be performed spatially or temporally.

As will be appreciated, there are various techniques for implementing a bandwidth reduction on a data signal. However an example embodiment of the spatial and the temporal sub-samplers 104, 106 are provided in FIGS. 7 and 8.

Figure 8:
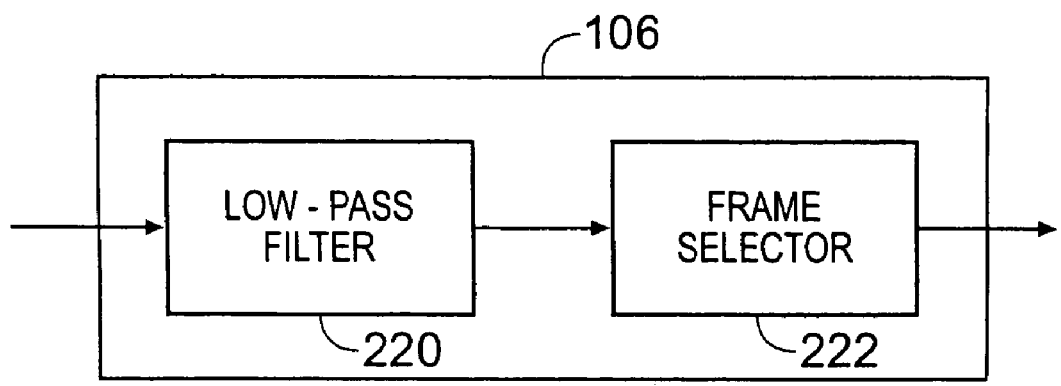
FIG. 8 is a schematic block diagram of a temporal sub-sampler forming part of the data processing apparatus shown in FIG. 5.

In FIG. 8, the spatial sub-sampler comprises a wavelet transformer 204 and a wavelet selector 206. The spatial sub-sampling is implemented using the wavelet transform. To this end, the wavelet transformer 204 is arranged to generate a second order wavelet transform of the material. The wavelet selector 206 is then arranged to select the lowest frequency wavelet sub-band, setting the wavelet coefficients in the other sub-bands to zero. This is illustrated in FIG. 8, by a representation of a wavelet transform of a video frame 210, formed by the wavelet transformer 204, and an illustration of the wavelet transformed frame 212 formed after processing by the wavelet selector 206. By selecting the lowest frequency wavelet sub-band of a second order wavelet transformed image, a spatially sub-sampled version of the video frame is formed, which has been down-sampled by a factor of eight.

Correspondingly, the temporal sub-sampler 106 illustrated in FIG. 8 includes a low-pass filter 220, which functions as an anti-aliasing filter for the temporally sub-sampled material. The bandwidth of the low pass filter is therefore set in accordance with a rate at which the material is to be sub-sampled. For the illustrative example, the temporal sub-sampling rate is four. Accordingly, after the low pass filter 220, a frame selector 222 is operable to select every fourth frame of the material, discarding the other frames, to form the temporally sub-sampled material.

Returning to FIG. 5, an output 108 of the bandwidth processor 102 feeds the reduced-bandwidth-version of the material to registration processor 110. The registration processor 110 is arranged to associate the samples of the reduced-bandwidth-version with coefficients of a watermark code word which is to be introduced into the reduced-bandwidth-version. Accordingly, a connecting channel 112 provides access to the samples of the reduced-bandwidth-version from a watermark processor 114.

The watermark processor 114 is arranged to receive one of a plurality of possible watermark code words from a code word generator 116'. As already explained the watermark code words are formed by a pseudo random number generator, which is initialised with a seed uniquely associated with the code word.

In order to reduce a likelihood of the watermark code word being perceiveable in the material item, the code word is adapted in accordance with a sensitivity of the material item to carry the code word coefficients. To this end, the samples to which the code word coefficients are to be added by the watermark processor 114, are made available to the watermark processor 114, from the registration processor 110 via the channel 112. Techniques for adapting the code word coefficients in accordance with a sensitivity of the material to carry the coefficients whilst maintaining a predetermined false positive and false negative detection probability are detailed in co-pending UK patent application number 0129865.2.

After adapting the code word coefficients, the code word is combined with the reduced-bandwidth-version of the material by a combining processor 120. The combining processor 120 receives the reduced-bandwidth-version of the material from the registration processor 110 from connecting channel 122 and the code word from the watermark processor 114 via connecting channel 124. At an output 126 of the combining processor 120 a marked reduced-bandwidth-version of the material item is formed, which is stored in a data store 128.

The reduced-bandwidth-version of the material is also fed from the channel 122 to a first input of a subtracting processor 130, via a second bandwidth adapter 123. The second bandwidth adapter is arranged to up-convert the bandwidth of the marked reduced-bandwidth-version to a bandwidth, which corresponds to that of the original material item. The up-conversion is performed in a corresponding way to the bandwidth reduction performed by the first bandwidth adaptation processor 102. The up-conversion of the marked reduced-bandwidth-version is done in order that the impaired version of the material item can be formed. The impaired version is formed by subtracting the up-converted reduced-bandwidth-version from a copy of the original material item.

To a second input of the subtracting processor 130 a copy of the original material item is fed from the material source 100. The samples of the up-converted reduced-bandwidth-version of the material item are subtracted from corresponding samples of the copy of the original material item to form an impaired version of the material item. The impaired version of the material item is then stored in second data store 134.

As indicated above, the reduced-bandwidth-version of the material item and the impaired version may be formed in a number of different ways. As such, in alternative embodiments the reduced-bandwidth-version of the original material item, and the impaired version may be formed using the wavelet transform. The original material item is transformed into the wavelet transform domain. The lowest frequencies sub-band is then selected to form the reduced-bandwidth-version. Effectively, selecting one of the sub-bands represents a form of spatial bandwidth reduction. The reduced-bandwidth-version is formed from a spatial and temporal bandwidth reduction, the spatial reduction corresponding to the selected wavelet sub-band. The temporal reduction, may be effected by forming a one-dimensional wavelet transform and selecting the lower of two sub-bands formed for a first order transform. What is left of the original material item after the sub-bands have been selected to form the reduced-bandwidth-version provides the impaired version of the material item.

As already explained advantages of embodiments of the present invention are provided by producing, from a material item having a relatively high bandwidth, a version of the material item which is impaired by subtracting a lower bandwidth part of the material item. For material such as, for example, video recordings, motion films and multi-media content a relative high bandwidth communication or storage facility is required to distribute such material. Typically, for mass distribution applications, the material is to be distributed to a large number of recipients. If there are N recipients, then in order to identify uniquely each recipient then N versions of the material item must be generated, each marked with a different code word. As such, the bandwidth or storage requirement to distribute the material items is N multiplied by the total bandwidth or storage capacity requirement for the material item. However, by forming the impaired version of the material item, the bandwidth or storage requirement is only equal to the bandwidth or storage capacity of the original material item. This is because the impaired material item can be distributed by a mass production facility, or for example distribution can be effected by multi-casting or broadcasting from a web-server or telecommunications system. It is only the relatively low bandwidth version, which needs to be watermarked individually for each user. Accordingly, it will be appreciated that a substantial bandwidth saving is provided. Furthermore, a time required to watermark the material item is reduced because the watermark code word is only being added to the reduced-bandwidth-version of the material. In addition, if the original material item were to be copied, and each copy marked individually the watermarked copy could not be multi-cast or broadcast to recipients.

A particular source of concern to film distributors is the control of sample copies of a film which are distributed pre-launch to advertise the film and to create interest amongst for example the press and film critics. Such samples of films are known by the term "screeners", which may take the form of a videocassette. However screeners are a known source from which pirate copies of films are generated. An embodiment of the present invention finds particular application in protecting media items such as screener tapes. For this application, the impaired material item is used to form the screener tape. By forming an impaired version of the film to be distributed on a screener tape, the screener tape can be mass-produced. However in order to view the screener tape the low bandwidth components of the film must be re-introduced. Since the low bandwidth components include a watermark code word, which uniquely identifies the version of the film when re-produced, the source of any pirate copies can be identified. The low bandwidth components of the film may only be released to someone wishing to review a screener tape, if specific conditions have been satisfied. These conditions might include a requirement that the person provides proof of identification. Accordingly, detecting the corresponding code word in a pirate copy uniquely identifies the person who received the original screener, which has been used to create the pirate copy.

Reproduction Apparatus

It will be envisaged from the above explanation that there are various ways in which the impaired material item and the reduced-bandwidth-version of the material item may be distributed. These may be distributed separately on different storage media or may be distributed on the same storage medium. For example a CD or DVD can be arranged to store the impaired material item, and on the same CD or DVD the marked reduced-bandwidth-version of the material item may be encrypted and stored. Several marked reduced-bandwidth-versions may be encrypted and stored, each of which is intended for a different user. Decryption may be performed separately for each different user, which may be provided with their decryption keys separately. This provides another example of a bandwidth saving provided by embodiments of the invention. This is because distributing a marked copy of the original material item for each recipient would represent a substantial increase in storage or bandwidth as compared to distributing one impaired version and a marked reduced-bandwidth-version for each recipient.

Correspondingly, the impaired version and the reduced-bandwidth-version may be communicated separately via a data communications network such as the Internet, an Intranet, an Extranet or Private IP network or a broadcast system such as a television network. The broadcast system may be a push or a pull broadcast system for the reduced-bandwidth-version and the impaired version of material items. In this case, the impaired version of the material item or the reduced-bandwidth-version of the material item may be communicated on channels separated for example by time or frequency.

An example form of a reproduction device according to an example embodiment is provided in FIG. 9. In FIG. 9, the impaired material item is, for example, downloaded from the internet by a telecommunications receiver 300 and stored. The reduced-bandwidth-version of the material item may be downloaded from the Internet by the receiver 300 or as illustrated in FIG. 9 a second lower bandwidth receiver 302 may be provided. The second lower bandwidth receiver 302 may be, for example, a CD or DVD player, whereby the reduced-bandwidth-version may be distributed via a CD or DVD. As illustrated in FIG. 9, the receivers 300, 302 are arranged to reproduce the impaired version and the reduced-bandwidth-version of the material item which are received via channels 304, 306 by a reproducing unit 308. The reproducing unit 308 contains a temporal alignment processor 310, a bandwidth processor 311 and a combiner 312. The bandwidth processor 311 is arranged to temporally and spatially up-convert the reduced-bandwidth-version received from the connecting channel 306, in accordance with the bandwidth reduction used to form the reduced-bandwidth-version, so that it can be combined with the impaired version. The temporal alignment processor 310 is arranged to synchronise as far as possible reproduction and registration of the impaired material item and the up-converted reduced-bandwidth-version of the material item so that the samples of each correspond with the samples of the original material item. The combiner 312 operates to add the samples of the up-converted reduced-bandwidth-version to the impaired version to reproduce samples representative of the original material item. The reproduced representation of the original material item is then fed via channel 314 to an output device 316. The output device 316 serves to reproduce the representation of the original material item.

An example implementation of the reproduction device is shown in FIG. 10. FIG. 10 provides an illustration of a digital cinema projector, which is arranged to generate a representation of a film. The film has been processed by the watermark encoder shown in FIG. 5 to form an impaired version of the film in which the low bandwidth components have been removed. The low bandwidth components correspond to a reduced-bandwidth-version of the film, which as explained is also formed by the watermark encoder. The cinema projector comprises a high capacity data store 300' and a low capacity store 302'. In correspondence with the general form of the reproducing device shown in FIG. 9, the data store 300' is arranged to receive and store the impaired film, whereas the marked reduced-bandwidth-version of the film is stored by the lower capacity data store 302'. A reproducing unit 308' is arranged to receive the impaired film and the reduced-bandwidth-version of the film which is combined to form a representation of the film, which is fed to a digital projector 316'. The digital projector 316' forms an output device, which projects the reproduced film on to a screen S.

Figure 11:
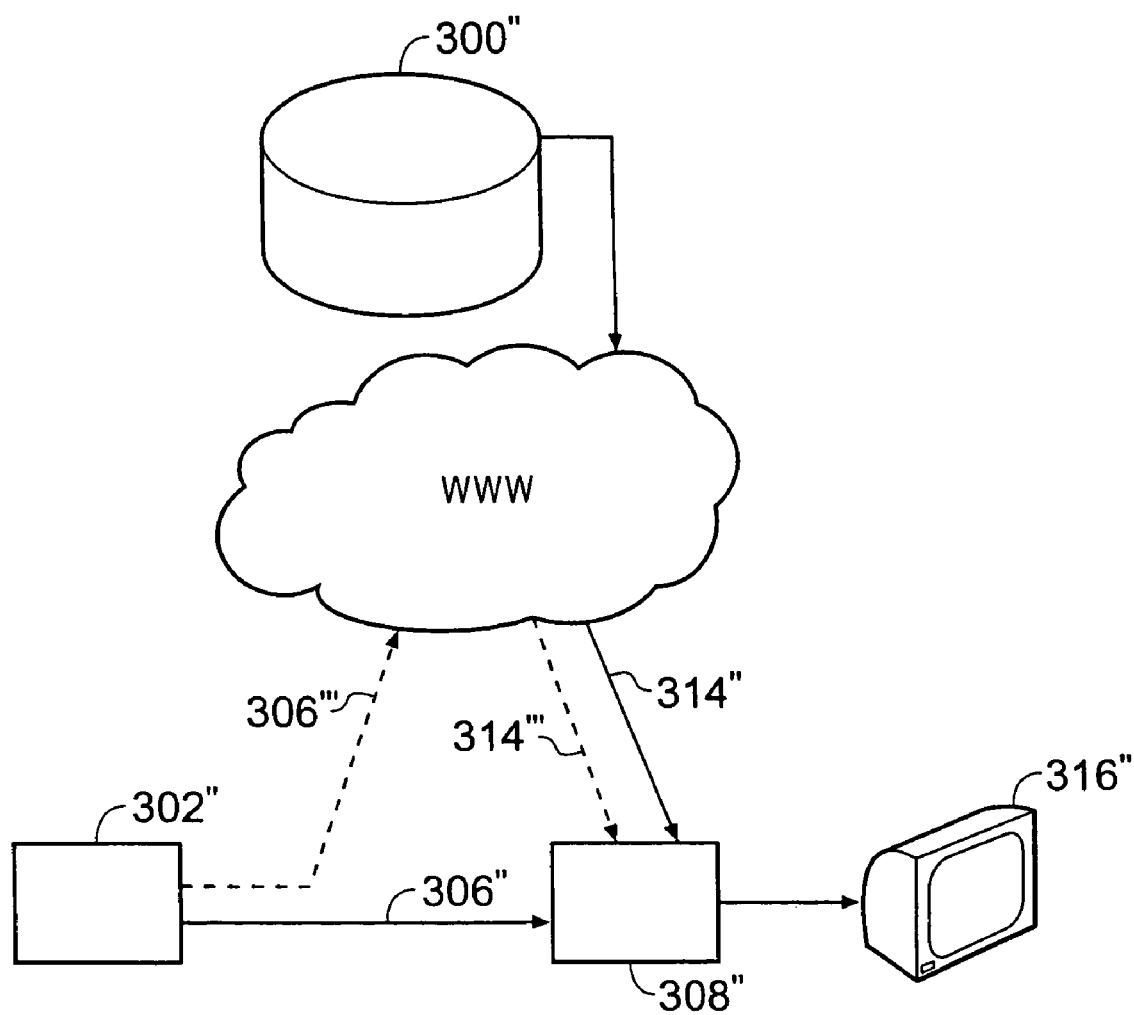
FIG. 11 is a schematic block diagram of a distribution arrangement for material items utilising the internet.

An alternative implementation is illustrated in FIG. 11. In FIG. 11 the impaired material, for example a video programme is downloaded to a reproducing unit 308" via the world-wide-web WWW from a web server 300". The reduced-bandwidth-version of the video which has been marked with a watermark code word is received from a data store 302" via a connecting channel 306". The data store may be a data reader operable to read data from a data carrier. The data carrier could be a diskette or a smart card. Alternatively the data store could be a semiconductor memory or a hard disc.

In an alternative embodiment the reduced-bandwidth-version of the video is received from a connection 314''', 306''' via the web WWW. As in the previous example, the reproducing unit 308" is arranged to combine the impaired video with the reduced-bandwidth-version of the video to form a representation of the original video, which is display on a display monitor 316".

Detection Data Processor

As already explained a code word, which is present in a marked version of a material item, can be detected with a predetermined false positive and false negative detection probabilities. The detection data processor illustrated in FIG. 2 can be arranged correspondingly to detect whether a code word is present in a suspect material item. However, because the code word has been introduced into the material item via the reduced-bandwidth-version, some adaptation of the detecting data processor shown in FIG. 2 is required as illustrated in FIG. 6.

Figure 6:
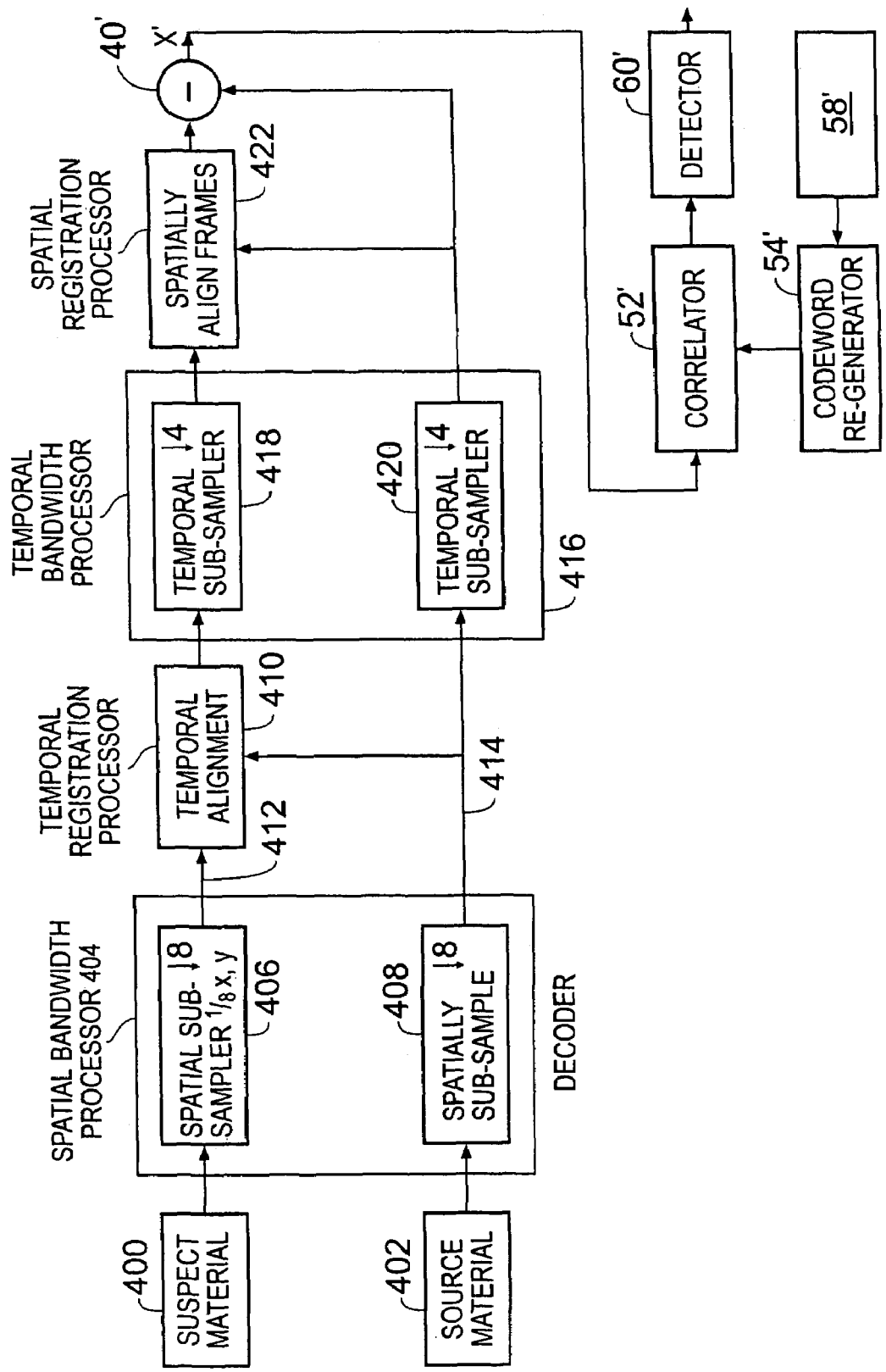
FIG. 6 is a schematic block diagram of a detecting data processing apparatus, which operates to detect watermark code words in the marked material items.
Figure 7:
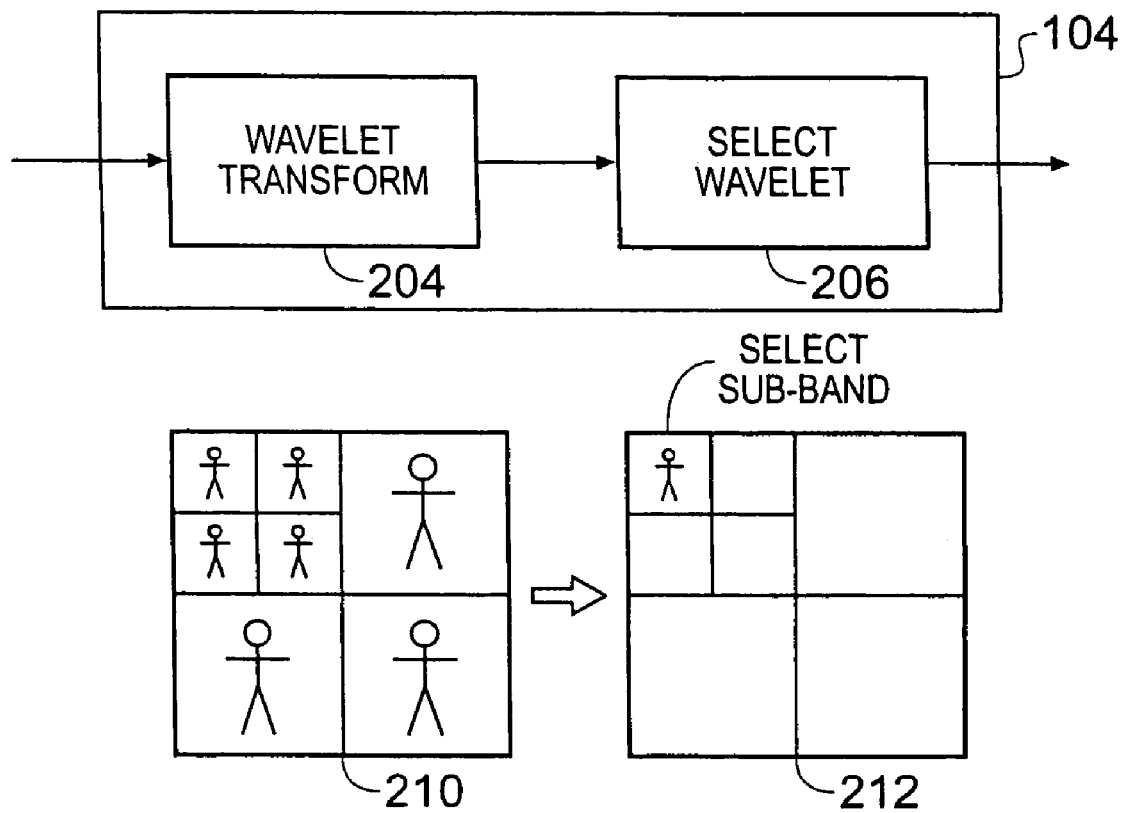
FIG. 7 is a schematic block diagram of a spatial sub-sampler forming part of the data processing apparatus shown in FIG. 5.

In FIG. 6 the suspect material is fed from a store 400 to a spatial bandwidth processor 404. Also fed to the spatial bandwidth processor 404 is a copy of the original source material from a second store 402. The spatial bandwidth processor 404 comprises a first spatial sub-sampler 406 and a second spatial sub-sampler 408. The first and second spatial sub-samplers 404, 406 are arranged to perform spatial sub-sampling to a rate which corresponds to the sub-sampling performed by the spatial sub-sampler 104 in the bandwidth processor 102 of the watermark encoder illustrated in FIG. 5. For this example, the sub-sampling rate is one eighth. The spatial sub-samplers 406, 408 can be implemented as illustrated in FIG. 7, as explained above. As will be appreciated the same spatial sub-sampler could be used for both the suspect and the original material versions.

The spatially sub-sampled versions of the suspect and the original material items are received by a temporal registration processor 410 from connecting channels 412, 414. The temporal registration processor 410 operates to temporally align the suspect and the original material items to the effect that the samples of the original version are correspondingly synchronised to the samples of the suspect version of the material item. The temporally aligned suspect and original material items are then fed to a temporal bandwidth processor 416. The temporal bandwidth processor 416 includes a first temporal sub-sampler 418 and a second temporal sub-sampler 420, which are arranged to received the temporally aligned suspect and original material items respectively. Temporal sub-sampling is performed by the first and second temporal sub-samplers 418, 420 on the suspect and original material items in correspondence with the temporal sub-sampling performed by the sub-sampler 106 in the encoding data processing apparatus 101 of FIG. 5. The temporally and spatially sub-sampled version of the suspect and original material items are then received by a spatial registration processor 422. The spatial registration processor 422 is operable to provide a spatial alignment of the samples of the suspect and the original material items.

The spatial and the temporal bandwidth processors 404, 416 operate to form reduced-bandwidth-versions of the suspect and the copy of the original material items. In effect the temporal and spatial registration processors 410, 422 are arranged to associate the samples of the reduced-bandwidth-versions of the suspect and the copy of the original material items. Effectively, therefore a subtracting processor 424 receives respective samples of the suspect and the original material items to which code word coefficients may have been added. A result of the subtraction is to form a vector of samples X' which represents a recovered code word. The recovered code word X' is then fed to a correlator 52' which operates in combination with the detector 60', as already explained with respect to the detecting data processor of FIG. 2 to determine whether the recovered code word corresponds to one of the set of code words. The explanation will, therefore not be repeated here. The detected code word can then uniquely identify a recipient of the offending material item.

As will be appreciated from the above explanation the impaired version of the material item and the reduced-bandwidth-version of the material item may be formed separately from one another. This can be arranged provided the part of the bandwidth forming the reduced-bandwidth-version of the material item is the same as that subtracted from the original item to form the impaired version of the material item. As such, a separate data processing apparatus may be used to form the impaired material item from that used to form the reduced-bandwidth-version to which the code word is added. Accordingly, it will be appreciated that an aspect of the present invention can provide a data processing apparatus operable to form a reduced-bandwidth-version of an original material item marked with a code word from a predetermined set of code words.

Correspondingly, a further aspect of the present invention can provide a data processing apparatus for forming an impaired version of the material item from which a marked representation of the original material item can be formed. Subtracting a reduced-bandwidth-version of the material item from a copy of the original material item forms the impaired version.

It will be appreciated that the data processing apparatus for forming the impaired material item may be situated in a different jurisdiction to that of the data processing apparatus for forming the marked reduced-bandwidth-version of the material item.

Various further aspects and features of the present invention are defined in the appended claims. Various modifications can be made to the embodiments herein before described without departing from the scope of the present invention.

The invention claimed is:

1. A data processing apparatus operable to form a reduced-bandwidth-version of an original material item, the reduced-bandwidth-version including a code word from a predetermined set of code words, and an impaired version of the material item from which a marked representation of the original material item can be formed if the impaired version of the material item were to be combined with the reduced-bandwidth-version including the code word, wherein the impaired version is formed by removing the reduced-bandwidth-version of the material item from a copy of the original material item.

2. A data processing apparatus as claimed in claim 1, comprising:

a first bandwidth processor operable to form the reduced-bandwidth-version of the original material item, the bandwidth reduction occurring in at least one of the temporal or spatial domains, an encoding processor operable to form the marked reduced-bandwidth-version of the original material item by combining the code word with the reduced-bandwidth-version of the original material item, and a material adaptation processor operable to form an impaired version of the original material item by subtracting the reduced-bandwidth-version of the material item from the original material item.

3. The data processing apparatus as claimed in claim 2, further comprising:

a second adaptation processor operable to up-convert the reduced-bandwidth-version of the original material item in accordance with the bandwidth reduction performed by the first bandwidth adaptation processor, the bandwidth of the up-converted reduced band width version corresponding to that of the original material item, and the material adaptation processor is operable to subtract the up-converted reduced-bandwidth-version from the copy of the original material item.

4. The data processing apparatus as claimed in claim 3, further comprising means for storing the marked reduced-bandwidth-version and the impaired version of the material item on separate media.

5. The data processing apparatus as claimed in claim 2, further comprising:

a data storage means operable to store the marked reduced-bandwidth-version and the impaired version of the material item individually.

6. The data processing apparatus as claimed in claim 5, wherein the data storage means stores a plurality of encrypted marked reduced-bandwidth-versions of the material item with the impaired material item on a storage medium.

7. The data processing apparatus as claimed in claim 2, wherein the encoding processor is operable to adapt coefficients of the code word with respect to the samples of the reduced-bandwidth-version of the material item to which the code word coefficients are to be combined, wherein the adaptation of the code word coefficients with respect to the reduced-bandwidth-version is made to the effect of reducing a likelihood of detection of the code word in the marked representation of the material item.

8. The data processing apparatus as claimed in claim 2, wherein the bandwidth reduction processor comprises a temporal sub-sampler operable to form the reduced-bandwidth-version of the material item in the time domain.

9. The data processing apparatus as claimed in claim 8, wherein the temporal sub-sampler comprises a low-pass filter in combination with a sample selector operable to selectively sample the material item after low-pass filtering.

10. The data processing apparatus as claimed in claim 2, wherein the encoding processor comprises a code word generator operable to generate the code word using a pseudo-random number generator initialised with a seed value uniquely associated with the code word, the code word coefficients being formed from numbers generated by the pseudo-random number generator.

11. The data processing apparatus as claimed in claim 10, wherein the encoding processor comprises
   a discrete cosine transform processor operable to transform the reduced-bandwidth-version of the material item into the discrete cosine transform domain, the reduced-bandwidth-version of the material item in the discrete cosine transform domain being represented as a plurality of discrete cosine transform coefficients, wherein the encoding processor is operable to combine the code word with the material item by adding each of the code word coefficients to a corresponding one of the discrete cosine transform coefficients, and
   an inverse discrete cosine transform processor operable to form the marked reduced-bandwidth-version of the material item by performing an inverse discrete cosine transform on the discrete cosine transformed reduced-bandwidth-version to which the code word has been added by the encoding processor.

12. The data processing apparatus as claimed in claim 1, further comprising:
   a data communications apparatus operable to communicate the marked reduced-bandwidth-version and the impaired version of the material item separately.

13. The data processing apparatus as claimed in claim 12, wherein the data communications apparatus transmits the impaired version of the material item via a data communications network, and the data communications apparatus distributes the reduced-bandwidth-version via a data carrier.

14. The data processing apparatus as claimed in claim 12, wherein the data communications apparatus distributes the impaired version of the material item via a data carrier, and the data communications apparatus transmits the reduced-bandwidth-version via a data communications network.

15. The data processing apparatus as claimed in claim 1, wherein the bandwidth reduction processor comprises a spatial sub-sampler operable to form the reduced-bandwidth-version of the material item.

16. The data processing apparatus as claimed in claim 15, wherein the spatial sub-sampler comprises a low pass filter and a sample selector operable to select predetermined samples with respect to a spatial reference after low pass filtering.

17. The data processing apparatus as claimed in claim 16, wherein the sample selector comprises a wavelet transform processor operable to form a wavelet transform of the material item and to select one of a plurality of sub-bands of the wavelet transform to form the reduced-bandwidth-version of the material after low pass filtering, the wavelet transform sub-bands providing the spatial reference.

18. The web server including a data processing apparatus as claimed in claim 1, operable to form an impaired version of a material item formed by subtracting a reduced-bandwidth-version from the material item, the web server being arranged to provide access to the impaired version via the Internet, Intranet, Extranet or Private IP network and to provide the reduced-bandwidth-version of the material item marked with a code word which identifies a version of the material item formed by combining the impaired material item with the marked-reduced-bandwidth version of the material item.

19. The distribution system including a data processing apparatus as claimed in claim 1, operable to form an impaired version of a material item formed by subtracting a reduced-bandwidth-version of the material item from the original material item, the distribution system being arranged to provide access to the impaired version and to distribute to users on demand the reduced-bandwidth-version of the material item marked with a code word which identifies a version of the material item distributed to each user, the code word being arranged to identify the version of material item formed by combining the impaired material item with the marked-reduced-bandwidth version of the material item.

20. A data signal representing an impaired material item or a reduced-bandwidth-version of the material item to which a code word has been embedded, as produced by the data processing apparatus according to claim 1.

21. A computer readable medium having recorded thereon a data signal representing an impaired material item or a reduced-bandwidth-version of the material item to which a code word has been embedded, as produced by the data processing apparatus according to claim 1.

22. A computer readable medium encoded with a computer program providing computer executable instructions, which when loaded onto a data processor configures the data processor to operate as a data processing apparatus according to claim 1.

23. A data carrier bearing an impaired material item and a plurality of a reduced-bandwidth-versions of the material item to which watermark code words have been added, as produced by the data processing apparatus according to claim 1, wherein the marked reduced-bandwidth-versions are encrypted.

24. A system for identifying the recipient of a material item, the system comprising:
   a data processing apparatus operable to form a reduced-bandwidth-version of an original material item, the reduced-bandwidth-version including a code word from a predetermined set of code words, and an impaired version of the material item from which a marked representation of the original material item can be formed if the impaired version of the material item were to be combined with the reduced-bandwidth-version including the code word, wherein the impaired version is formed by removing the reduced-bandwidth-version of the material item from a copy of the original material item,
   a reproducing apparatus for reproducing a representation of said original material item from said reduced-bandwidth-version marked with a code word, said reproducing apparatus comprising
   a receiver operable to receive the impaired version of the material item, and to receive the marked reduced-bandwidth-version of the original material item, and
   a combiner operable to combine the marked reduced-bandwidth-version of the material item with the impaired version to reproduce a representation of the original material item, and
   a detecting data processor operable to detect with a predetermined false positive probability the recipient by detecting the presence or absence of the code word in the material.

25. A method of processing an original material item, comprising:
   forming a reduced-bandwidth-version of the material item, the reduced-bandwidth version including a code word from a predetermined set of code words and an impaired version of the material item from which a marked representation of the original material item can be formed if the impaired version of the material item were to be combined with the reduced-bandwidth-version including the code word.

26. The method of processing as claimed in claim 25, wherein the forming a reduced-bandwidth-version of an original material item, comprises forming the bandwidth reduction in at least one of temporal or spatial domains, and combining the code word with the reduced-bandwidth-version of the original material item, and the forming the impaired version of the original material item comprises subtracting the reduced-bandwidth-version of the material item from the original material item.

27. A computer readable medium encoded with a computer program providing computer executable instructions, which when loaded on to a data processor causes the data processor to perform the method according to claim 25.

28. A computer program product having a computer readable medium having recorded thereon information signals representative of the computer program claimed in claim 27.

29. An apparatus for processing an original material item, comprising:

means for forming a reduced-bandwidth-version of the material item marked with a code word from a predetermined set of code words, and means for forming an impaired version of the material item from which a marked representation of the original material item can be formed if the impaired version of the material item were to be combined with the reduced-bandwidth-version including the code word.

30. The apparatus for processing as claimed in claim 29, wherein the means for forming a reduced-bandwidth-version of an original material item, comprises means for forming the bandwidth reduction in at least one of temporal or spatial domains, and means for combining the code word with the reduced-bandwidth-version of the original material item, and the means for forming the impaired version of the original material item comprises means for subtracting the reduced-bandwidth-version of the material item from the original material item.

* * * * *